United States Patent [19]

Wakim

[11] Patent Number: 4,847,900
[45] Date of Patent: Jul. 11, 1989

[54] INFRARED HOOKSWITCH FOR A TELEPHONE

[75] Inventor: Michael J. Wakim, Nepean, Canada

[73] Assignee: Northern Telecom Limited, Montreal, Canada

[21] Appl. No.: 189,005

[22] Filed: May 2, 1988

[51] Int. Cl.⁴ .................... H04M 1/06; H04M 11/00
[52] U.S. Cl. .................................. 379/424; 379/443
[58] Field of Search .................. 379/93, 96, 97, 98, 379/100, 442, 443, 424, 355, 357

[56] References Cited

U.S. PATENT DOCUMENTS 4,203,006  5/1980  Mascia .............................. 379/443
4,592,069  5/1986  Redding ........................... 379/443

FOREIGN PATENT DOCUMENTS 0128500  12/1984  European Pat. Off. ............ 379/424

Primary Examiner—Jin F. Ng
Assistant Examiner—Bonita Lewis
Attorney, Agent, or Firm—Jean-Pierre Fortin

[57] ABSTRACT

An optical hookswitch assembly useable on a telephone set as an optical communications port is disclosed. The hookswitch assembly is comprised of light emitting and detecting diodes so disposed in the telephone so as to detect the presence of a handset. A processor connectable to the telephone circuitry and the light emitting and detecting diodes is provided such that the telephone circuitry is activated by the processor when the light emitting and detecting diodes fail to detect the presence of a handset. The light emitting and detecting diodes are useable as an optical communciations port for accessing the processor by allowing an external computer to communicate with the processor via an optical coupler.

8 Claims, 3 Drawing Sheets

INFRARED HOOKSWITCH FOR A TELEPHONE

FIELD OF THE INVENTION

This invention relates to an optical hookswitch for telephones but more particularly to an optical hookswitch which can be used as an optical communications port.

BACKGROUND OF THE INVENTION

The further developments of electronic telephones has seen the elimination of moving parts with the exception of the hookswitch.

As telephones become more complex, the need to install software as late as possible in the manufacturing process becomes more important. This is true especially if the same telephone can have several versions of software to meet the needs of different customers. Also, the ability to test the product as late in the manufacturing process as possible has become more and more important. This reduces the number of variables that could go wrong before the product leaves the plant.

A problem which has become more apparent as telephones become more complex is the inconvenience of losing your personal phone directory if the phone is ever removed for repairs. Some electronic telephones now have the capacity to hold up to 125 entries each including a name and phone number. This typically would take over an hour to reenter by hand.

Also, the use of a mechanical hookswitch which has exposed metal pins increases the likelihood of electrostatic discharge which can be quite detrimental to the proper operation of telephones operating with complex software.

There is therefore a requirement for a telephone hookswitch which does not require the use of moving parts, which allows the telephone to be inspected immediately before leaving the factory as well as allow diagnostic tests to be performed once the telephones are being used by the customer. In addition, there is a requirement for a hookswitch assembly which allows access to the telephone microprocessor for the loading and unloading of software as may be required.

SUMMARY OF THE INVENTION

Accordingly, a first object of the present invention is to provide an optical hookswitch adapted to overcome the aforementioned problems.

A second object of the present invention is to provide an optical hookswitch for a telephone which can be used as an optical communications port thereby allowing the telephone to be analyzed without disassembly.

According to a third object of the present invention, there is provided a telephone hookswitch which can be used as an optical communications port which when used with an optical coupler can be used to transfer the software into the telephone before the shipment to the customer.

According to a fourth object of the present invention, there is provided an optical telephone hookswitch which can be used as an optical communications port to allow the extraction of the user's phone directory from the old telephone and transmit the directory into a new telephone.

According to a fifth object of the present invention, there is provided an optical hookswitch for use with telephones which can be used as an optical communication port that allows access to the telephone microprocessor by means of an optical coupler which can be connected to an external portable computer.

Accordingly, an aspect of the present invention is to provide an optical hookswitch assembly useable on a telephone set as an optical communications port, comprising: light emitting and detecting means so disposed in said telephone so as to detect the presence of a handset; processor means connectable to telephone circuitry means and said light emitting and detecting means, said telephone circuitry means being activated by said processor means when said light emitting and detecting means fails to detect the presence of said handset, said light emitting and detecting means being useable as an optical communications port for accessing said processor means, by allowing an external computer to communicate with said processor means via optical coupler means.

DESCRIPTION OF THE DRAWINGS

Particular embodiments of the invention will be understood in conjunction with the accompanying drawings in which:

Referring now to FIG. 1, we have shown generally at reference numeral 10 the basic configuration of the optical hookswitch assembly of the present invention. The assembly is comprised of telephone circuitry 11 used to initiate a phone call, the telephone circuitry is connected to phone line 12. CPU 13 controls the operation of the telephone by activating the telephone circuitry 11 to initiate a phone call.

Figure 1:
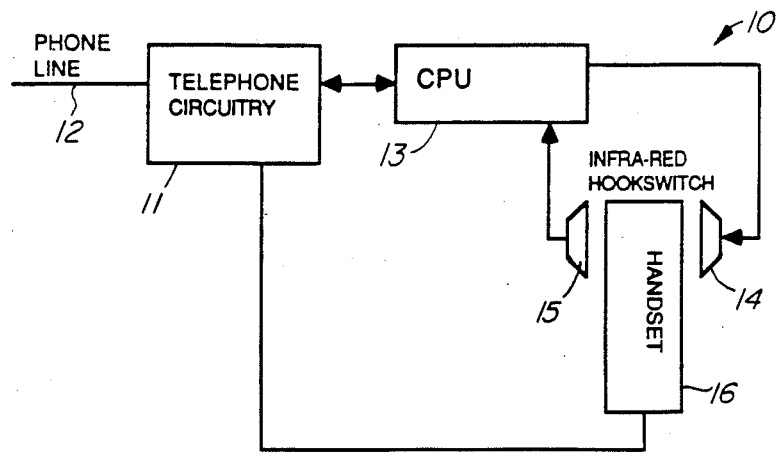
FIG. 1 is a block diagram illustrating the optical hookswitch assembly of the present invention.

In the present embodiment, an infrared diode 14 and detector 15 are disposed in the handset cradle of the telephone. These are so disposed such that when handset 16 is removed from the cradle, light emitted from diode 14 will reach detector 15 indicating an off-hook state.

In operation, the microprocessor 13 lights infrared diode 14 several times per second and monitors for a detected signal at the opposite end of the handset cradle. When the handset is lifted, the microprocessor detects the infrared beam by means of detector 15 and will activate the telephone circuitry 11 to establish a dial tone.

Figure 2:
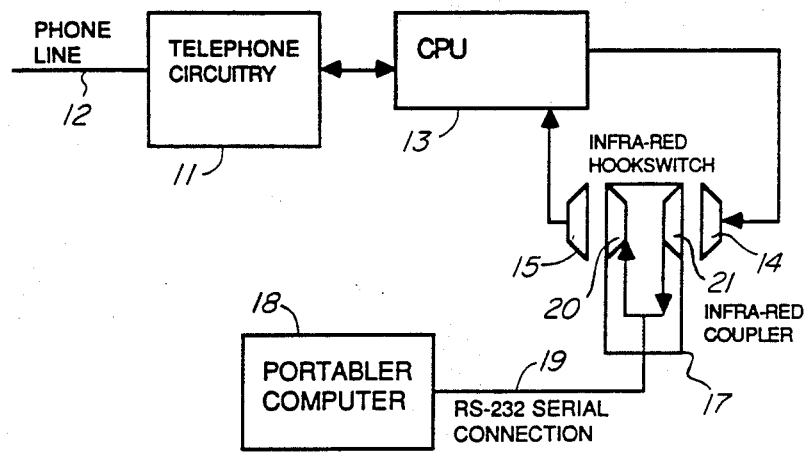
FIG. 2 is a block diagram of the optical hookswitch of the present invention when used with an external optical coupler.

Referring now to FIG. 2, we have shown the basic configuration of the optical hookswitch assembly when used as a communications port. In FIG. 2, an infrared coupler 17 has been placed in the handset cradle to allow an external portable computer 18 to communicate via a serial connection 19 with CPU 13. Infrared coupler 17 is similarly provided with an infrared diode 20 adapted to be placed adjacent photodetector 15. An infrared photodetector 21 is similarly placed on infrared coupler 17 and is adapted to be disposed adjacent infrared diode 14 when the coupler is placed in the handset cradle. The CPU software has been modified to allow the microprocessor to flash the hookswitch infrared diode 14 at speeds up to 1200 bits/sec. This allows portable computer 18 to extract information from CPU 13.

Likewise, data from portable computer 18 can be transmitted optically into the telephone and in particular CPU 13 by flashing data through hookswitch photodetector 15 by means of infrared diode 20.

Infrared coupler 17 converts optical signals received from photodetector 21 into a standard serial signal. This can be achieved by methods well known in the art. The conversion of optical signals into serial signals allow any off-the-shelf portable computer to communicate with the telephone CPU via the optical hookswitch assembly of the present invention. The external computer can examine memory contents within the phone, run diagnostic tests, and most importantly transfer data such as a phone directory into the phone. When the portable computer communicates with the telephone, software within the phone must receive the messages and act on them. This software within the phone is called a monitor.

Figure 3:
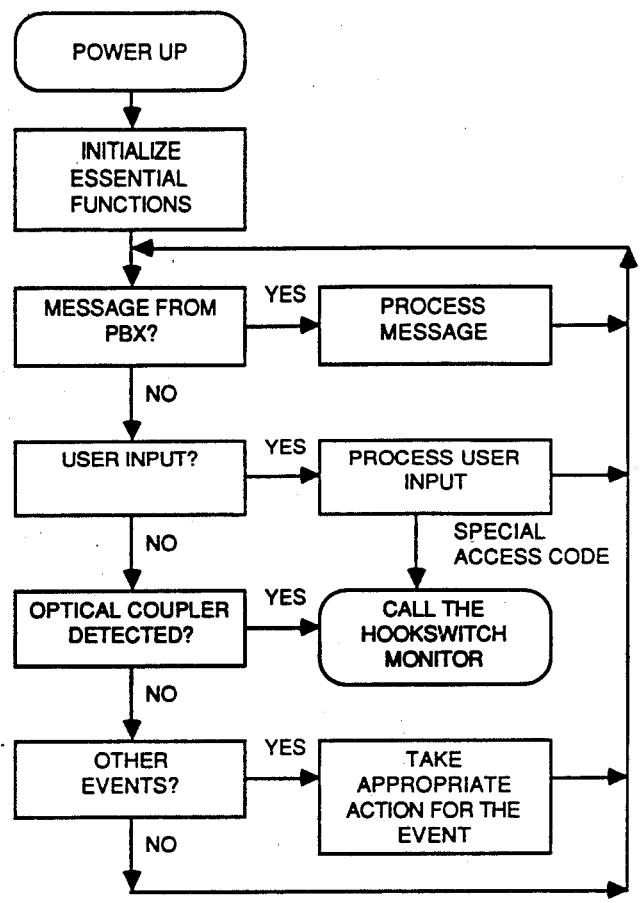
FIG. 3 is a flow chart illustrating the main polling loop program used with the present invention.

Referring now to FIG. 3, we have shown a flow chart of the telephone main polling loop. The hookswitch is initiated by having the user press a special sequence of keys which are read via the main polling loop. The polling loop can be thought of as the operating system for the phone. It constantly checks all of the peripherals and distributes CPU time accordingly. If the correct sequence is pressed, the polling loop is excited, and the hookswitch monitor program UART is entered.

Figure 4:
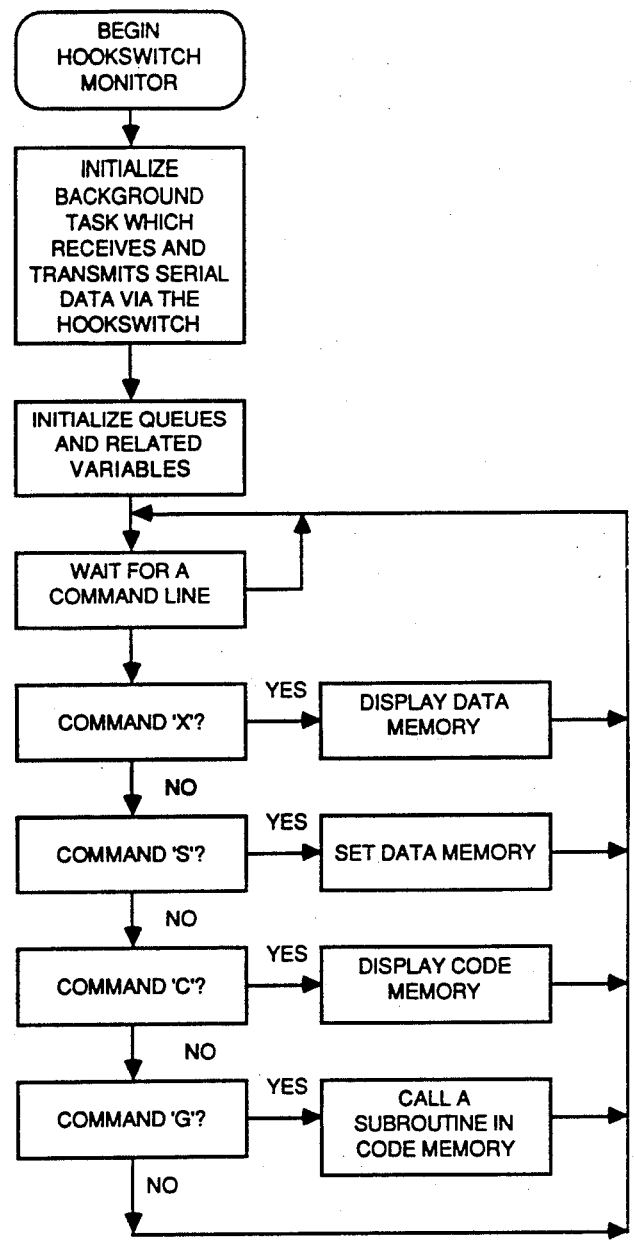
FIG. 4 is a flow chart illustrating the hookswitch monitor program.

Referring now to FIG. 4, we have shown a flow chart of the hookswitch monitor program UART. Most computer systems include a monitor as the lowest level operating system. The monitor is usually the first program to run when a computer system is turned on. It allows the operator to perform basic tasks such as diagnostics tests. The monitor also allows the operator to initiate a bootstrap loader which loads a higher level operating system usually from disc.

The monitor of the telephone of the present embodiment, is similar in many ways. When the phone is first turned on, the microprocessor checks the hookswitch for the presence of an infrared coupler. If a coupler is detected, the monitor is initiated and the phone is controlled completely through the infrared coupler. If no coupler is detected, the phone continues normal power up procedures, bringing itself to normal operation. An end user does not need to be aware of the monitor when he powers up the set.

When the hookswitch monitor is initiated, the UART program takes control of the phone. The UART program does the following: it enables an interrupt routine for reading and writing serial data via the hookswitch; begins monitoring the hookswitch for commands; and each time a command is received, the UART program executes it, then waits for the next command.

Some of these commands are as follows:

| prompt | | | |
|---|---|---|---|
| > | x | addr1 addr2 = | dump auxiliary data memory between the two addresses |
| | e.g. | x 0 100 | |
| > | S | addr data data = | set auxiliary data memory starting at addr |
| > | C | addr1 addr2 = | dump code memory |
| > | G | addr = | call a procedure (can be any address in code space) |

The monitor allows the user to examine and modify the memory, execute programs already in the telephone, provide access to input/output devices such as the LCD display, speaker and telephone line. In effect, the monitor allows the user to do almost anything that the software in the phone can do. The monitor is however, constrained by the 1200 bit per second speed limit of the port. Basically, the monitor is capable of emulating the full operation of the phone.

Accordingly, when used as an optical communication port the hookswitch assembly of the present invention allows the telephone to be analyzed without disassembly. This is useful both for outgoing inspection at the factory as well as field diagnostics. And as indicated earlier, the ability to test a product as late in the manufacturing process as possible is relatively important. It reduces the number of variables that could go wrong before the product leaves the plant.

In addition, as telephones become more complex, the need to install software as late as possible in the manufacturing process becomes more important. This is true especially if the same phone can have several versions of software to meet the needs of different customers. With the optical communication port of the present invention, a telephone can be manufactured with only the monitor installed. An optical coupler can then be used to transmit the software into the phone just before shipment. In addition, it allows the repairman to upgrade software outside. Also, the optical communication port system allows a repairman to extract the user's phone directory from an old phone and transmit it into a new phone when repairs are being done. This can be relatively important in telephones such as the Meridian M3000 Touchphone (trademark) which can hold up to 125 entries including a name and phone number.

Other uses for optical devices to simplify connections to telephone sets are clearly possible and can be implemented by those knowledgeable in this art. The optical communication port assembly presented here is merely one technique which can be implemented without difficulty.

What is claimed is:

1. An optical hookswitch assembly useable on a telephone set as an optical communications port, comprising:
    light emitting and detecting means so disposed in said telephone so as to detect the presence of a handset;
    processor means connectable to telephone circuitry means and said light emitting and detecting means, said telephone circuitry means being activated by said processor means when said light emitting and detecting means fails to detect the presence of said handset, said light emitting and detecting means being useable as an optical communications port for accessing said processor means, by allowing an external computer to communicate with said processor means via optical coupler means.

2. An optical hookswitch assembly as defined in claim 1 wherein said processor means comprises message monitoring means, said message monitoring means being initiated when said processor means detects the presence of said optical coupler means.

3. An optical hookswitch assembly as defined in claim 2 wherein said processor means can communicate with said external computer via said optical coupler means by controlling said light emitting means to emit a light signal at a predetermined baud rate which can be read by said optical coupler means.

4. An optical hookswitch assembly as defined in claim 3 wherein said external computer can communicate with said processor means via said optical coupler means by controlling said optical coupler means to emit a light signal at said predetermined baud rate which can be read by said light detecting means and transmitted to said processor means.

5. An optical hookswitch assembly as defined in claim 4 wherein said light emitting and detecting means comprises a light emitting diode and photodetector adapted to be disposed in the handset cradle of said telephone set, said light emitting diode and photodetector being so disposed therein such that when said handset is removed from said cradle, light emitted from said light emitting diode will be detected by said photodetector thereby signalling said processor means to initiate said telephone circuitry means.

6. An optical hookswitch assembly as defined in claim 5 wherein said optical coupler means comprises an optical coupler having a light emitting diode and a photodetector, said light emitting diode and photodetector being so disposed in said coupler such that when said coupler is placed in said handset cradle. the light emitting diode and photodetector of said coupler will be positioned adjacent the photodetector and light emitting diode, respectively of said handset cradle.

7. An optical hookswitch assembly as defined in claim 6 wherein said predetermined baud rate is 1200 bits/sec.

8. An optical hookswitch assembly as defined in claim 7 wherein said light emitting diodes and said photodetectors operate at infrared.

* * * * *